United States Patent
Bayar et al.

(10) Patent No.: US 9,776,608 B2
(45) Date of Patent: Oct. 3, 2017

(54) ENHANCED REGENERATIVE BRAKING CONTROL METHOD FOR BRAKE BOOSTER PRESSURE BUILD-UP DELAY COMPENSATION

(71) Applicant: Ford Global Technologies, LLC, Dearborn, MI (US)

(72) Inventors: Kerem Bayar, Dearborn, MI (US); Dale Scott Crombez, Livonia, MI (US); Jinkoo Lee, Ann Arbor, MI (US); John Phillip McCormick, Milford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 476 days.

(21) Appl. No.: 13/935,003

(22) Filed: Jul. 3, 2013

(65) Prior Publication Data
US 2015/0012197 A1    Jan. 8, 2015

(51) Int. Cl.
| G06F 7/70 | (2006.01) |
|---|---|
| G06F 19/00 | (2011.01) |
| G06G 7/00 | (2006.01) |
| G06G 7/76 | (2006.01) |
| B60T 8/72 | (2006.01) |
| B60T 1/10 | (2006.01) |
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
CPC ............... *B60T 8/72* (2013.01); *B60T 1/10* (2013.01); *B60T 2270/604* (2013.01)

(58) Field of Classification Search
CPC ........................................................ B60T 8/72
USPC ........................................................ 701/70, 22
See application file for complete search history.

(56) References Cited

U.S. PATENT DOCUMENTS

| 6,244,676 B1 | 6/2001 | Watanabe |
|---|---|---|
| 6,289,271 B1 | 9/2001 | Isono |

(Continued)

FOREIGN PATENT DOCUMENTS

| JP | 2005349880 A2 | 12/2005 | |
|---|---|---|---|
| JP | WO 2013051093 A1 * | 4/2013 | ............... B60K 6/48 |

OTHER PUBLICATIONS

English Translation for WO2013/051093A1.*

(Continued)

*Primary Examiner* — Mahmoud Ismail
(74) *Attorney, Agent, or Firm* — David Kelley, Esq.; Tung & Associates

(57) ABSTRACT

A regenerative braking control method. An illustrative embodiment of the method includes selecting a vehicle speed at onset of transition from regenerative braking to friction braking of a vehicle, comparing the vehicle speed to a threshold value, applying a delayed regenerative braking torque ramp out to a hybrid powertrain and sending an undelayed regenerative braking torque ramp-out signal to a vehicle brake controller without at onset of transition from regenerative braking to friction braking of the vehicle if the vehicle speed falls below the threshold value.

19 Claims, 2 Drawing Sheets

(56) References Cited

U.S. PATENT DOCUMENTS

| | | | |
|---|---|---|---|
| 2005/0057098 A1* | 3/2005 | Bouchon | B60K 6/28 307/10.1 |
| 2008/0173490 A1 | 7/2008 | Itoh | |
| 2009/0115242 A1 | 5/2009 | Ohtani | |
| 2009/0118887 A1* | 5/2009 | Minarcin et al. | 701/22 |
| 2011/0192661 A1 | 8/2011 | Hennings | |
| 2012/0136547 A1* | 5/2012 | Miyazaki et al. | 701/70 |
| 2014/0200111 A1* | 7/2014 | Murakami | B60K 6/48 477/4 |

OTHER PUBLICATIONS

"Development of Co-operative Control Algorithm for Parallel HEV With Electric Booster Brake During Regenerative Braking", 978-1-61284-246-9/11, 2011 IEEE.

* cited by examiner

ENHANCED REGENERATIVE BRAKING CONTROL METHOD FOR BRAKE BOOSTER PRESSURE BUILD-UP DELAY COMPENSATION

FIELD

Illustrative embodiments of the disclosure are generally directed to regenerative braking control methods. More particularly, illustrative embodiments of the disclosure are generally directed to an enhanced regenerative braking control method which eliminates or reduces rough deceleration trends by compensating for brake booster torque build-up delay.

BACKGROUND

To improve fuel economy, hybrid electric vehicles (HEVs) may utilize regenerative braking, in which an electric machine applies regenerative braking torque to the powertrain of the vehicle during driver-induced friction braking of the vehicle. The electric machine converts the resulting kinetic energy into storable electrical energy which may subsequently be made available for vehicle propulsion. Regenerative braking is one of the enablers of hybrid vehicle technologies. It has been found that 15%~30% fuel economy improvements over a non-regenerative braking-capable vehicle can be achieved using regenerative braking.

During driver-induced friction braking of a vehicle, the vehicle brake controller may transmit a brake torque command to the brake booster, which applies friction braking torque to the brakes at the vehicle wheels to decelerate or stop the vehicle. Simultaneously, the vehicle system controller may transmit a regenerative braking torque command to the hybrid powertrain to initiate regenerative braking. The regenerative braking torque command may dictate the magnitude of the regenerative braking torque which is applied to the hybrid powertrain to effect regenerative braking. The regenerative braking torque command may subsequently be reported to the vehicle brake controller to indicate the point at which ramp-out, or reduction and abatement, of the regenerative braking torque has begun. In turn, the vehicle brake controller may use both the driver torque command and the regenerative braking torque command to obtain the brake torque command which induces the brake booster to apply friction braking to the brakes.

At the onset of friction braking, there may normally be a slight delay in the accumulation of friction braking torque which the brake booster applies to the brakes at the vehicle wheels. This booster torque buildup delay may cause rough vehicle deceleration trends during the delay period, as illustrated in FIG. 1. It can be observed that at a low speed threshold (around 17.4 s) where regen is not desired, the powertrain torque starts ramping out, whereas the brake pressure starts ramping in, to compensate for reducing regen and satisfy the driver's brake request. However, due to the time response characteristics of the brake booster, the friction brake pressure starts ramping in, with a 120 ms delay. This delay, which is generally followed by an overshoot in booster pressure, causes relatively rougher deceleration trends, as can be verified from the deceleration plot. The delay is the time rate of change of deceleration and can reach 0.13 g/s, which may be manifested as a jerk that can be felt by professional drivers.

Typical booster torque buildup delay periods are on the order of 100-200 ms with 5 bar maximum overshoot.

The regenerative brake torque ramp down may be delayed as a solution, i.e. to compensate the brake booster delay, but reporting the delayed regenerative braking torque to the brake module may further increase friction brake ramp up delay as the friction brake ramp in is computed within the brake module by subtracting the regenerative braking torque from the total driver brake request.

Therefore, it may be desirable to report the undelayed, or raw, ramp-out of the regenerative braking torque to the vehicle brake controller at the onset of friction braking. Inducing such a delay in regenerative braking torque and instead of reporting this delayed regenerative braking torque, reporting the undelayed, or raw, regenerative braking torque to the brake module may yield synchronous ramp-up of friction braking to compensate for and reduce the effect of the booster torque buildup delay, eliminating or reducing rough deceleration trends which would otherwise occur during the booster torque buildup delay period.

SUMMARY

Illustrative embodiments of the disclosure are generally directed to a regenerative braking control method. An illustrative embodiment of the method includes obtaining a vehicle speed at onset of transition from regenerative braking to friction braking of a vehicle, comparing the vehicle speed to a threshold value, applying a delay for the regenerative braking torque and reporting a raw, or undelayed, regenerative torque ramp-out signal to a vehicle brake controller at onset of friction braking.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 2:
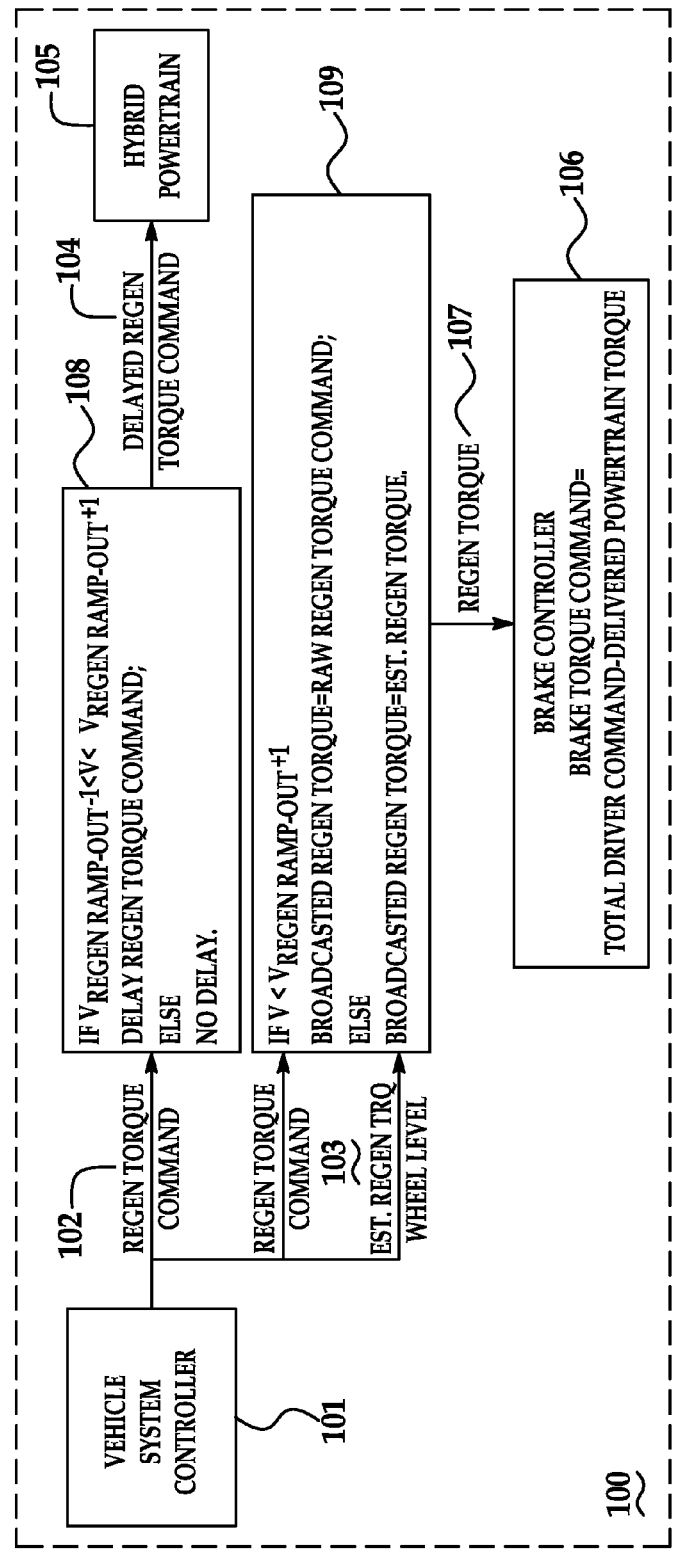
FIG. 2 is a block diagram which illustrates an exemplary enhanced regenerative braking control method.

Referring to FIG. 2, a block diagram 100 which illustrates an exemplary embodiment of an enhanced regenerative braking control method is shown. At the onset of friction braking of a vehicle, a vehicle system controller 101 commands a regenerative braking torque command 102. The regenerative braking torque command 102 may initiate ramp-out (reduction and elimination) of regenerative torque applied to the hybrid powertrain 105 during transition from regenerative braking torque to friction braking of a vehicle. Depending on the speed (V) of the vehicle at the onset of friction braking, the regenerative braking torque command 102 may be subjected to a delay (104), with an algorithm shown in 108 to compensate friction braking ramp up delay.

In FIG. 2, $V_{regen\ ramp-out}$ is a calibration parameter which corresponds to the vehicle speed at which regenerative torque ramp-out, or reduction and elimination of the regenerative braking torque at the hybrid powertrain 105, is initiated. In some applications, $V_{regen\ ramp-out}$ may be about 8 km/hr. $V_{regen\ ramp-}$out+1 may be a higher threshold value than $V_{regen\ ramp-out}$ (such as 9 km/hr, for example and without limitation) whereas $V_{regen\ ramp-out}-1$ may be a lower threshold value than $V_{regen\ ramp-out}$ (such as 7 km/hr, for example and without limitation).

In the event that V is greater than a lower threshold speed ($V_{regen\ ramp-out-1}$) and less than a higher threshold speed ($V_{regen\ ramp-out+1}$), the regenerative braking torque command 102 may be delayed with respect to the algorithm at 108. In that case, the delayed regenerative braking torque command 104 may be transmitted to the hybrid powertrain 105. Therefore, the delayed regenerative braking torque command 104 may delay ramp-out of the regenerative braking torque which is applied to the hybrid powertrain 105. The time period or magnitude of delay between the raw regenerative braking torque command 102 and the delayed regenerative braking torque command 104 may correspond to the friction braking, or the booster torque buildup delay of the vehicle brake system at the onset of transition from regenerative braking to friction braking.

In the event that V is greater than $V_{regen\ ramp-out}+1$ or less than $V_{regen\ ramp-out}-1$, there may be no delay in the regenerative braking torque command 102, according to the algorithm 108 and the estimated regenerative braking torque at wheel level 103 may be broadcasted to vehicle brake controller.

Again depending on the speed (V) it may be determined whether the raw, or undelayed regenerative braking torque command 102 or the estimated regenerative braking torque at wheel level 103 is reported to the vehicle brake controller, according to algorithm 109. During delaying regenerative braking torque command which corresponds to a V that is greater than a lower threshold speed ($V_{regen\ ramp-out}-1$) and less than a higher threshold speed ($V_{regen\ ramp-out}+1$), the raw, or undelayed regenerative braking torque command 102 may be broadcasted to the vehicle brake controller. Therefore, at the onset of friction braking, the raw, or undelayed regenerative braking torque command 102 may indicate to the brake controller 106 that ramp-out of the regenerative braking torque at the hybrid powertrain 105 is underway although application of regenerative braking torque to the hybrid powertrain 105 is actually being maintained and ramp-out has not been initiated.

Consequently, the vehicle brake controller 106 may calculate the brake torque command by subtracting the regen torque 107, which is actually the raw, or undelayed regenerative braking torque command 102 (thinking it is the actual estimated regenerative braking torque at wheel level) from the total driver braking torque command. The vehicle brake controller 106 may transmit the calculated brake torque command to the brake booster (not shown), which applies friction braking to the brakes (not illustrated) of the vehicle.

After the friction braking has been applied to the brakes for a time which corresponds to the booster torque buildup delay, the regenerative braking torque may be ramped out. By means regenerative braking torque ramp out and friction braking ramp in may be synchronized, and the rough deceleration trend which may otherwise occur during the booster torque buildup delay period may be eliminated or reduced.

At a speed lower than a lower threshold speed ($V_{regen\ ramp-out}-1$) estimated regenerative braking torque at wheel level 103 may be broadcasted again to the vehicle brake controller 106. The vehicle brake controller 106 may calculate the brake torque command by subtracting the estimated regenerative braking torque at wheel level 103 from the total driver torque command and command friction braking ramp-in in the usual manner, to avoid overshoot of the friction braking ramp in.

Figure 1:
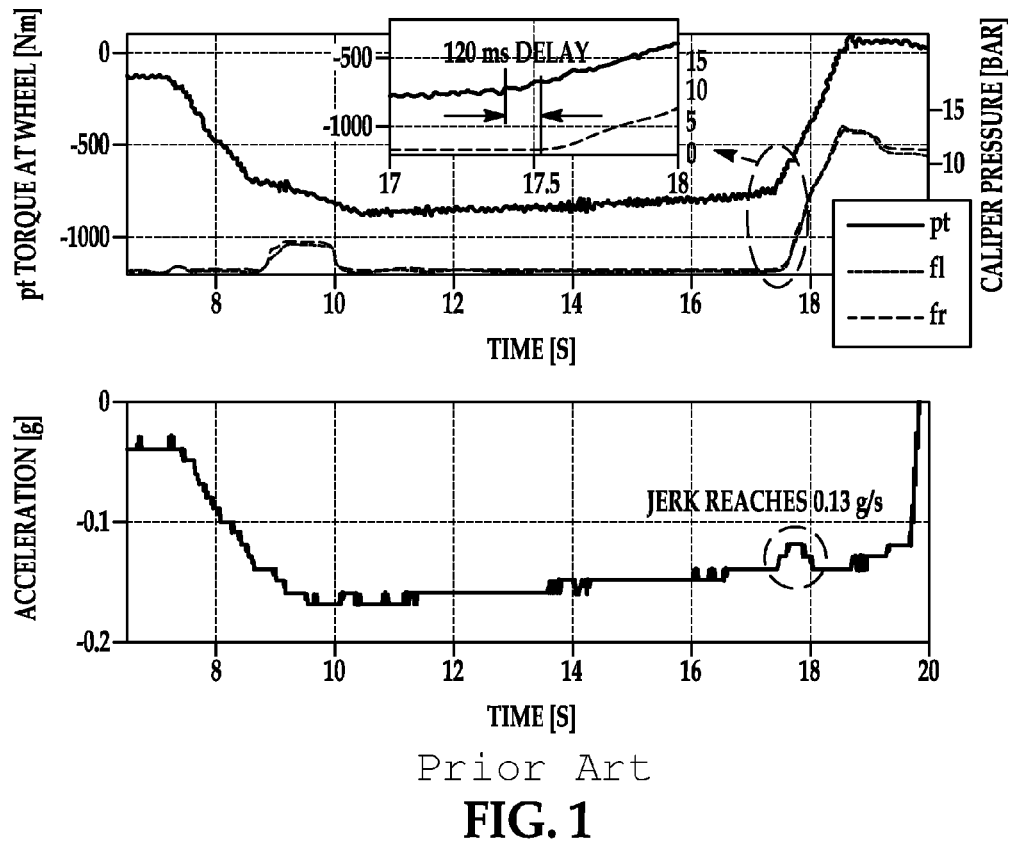
FIG. 1 is a figure showing the problem to be solved, i.e. the booster delay and the jerk caused by the delay.
Figure 3:
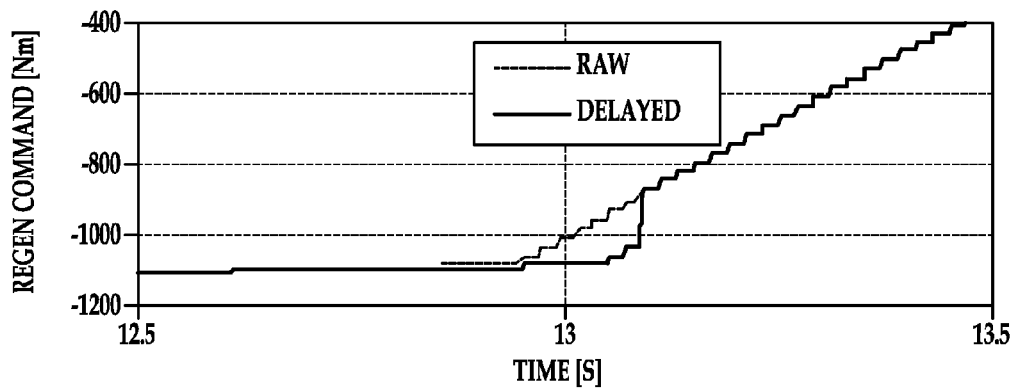
FIG. 3 is a graph with regenerative torque command plotted as a function of time, more particularly illustrating a 100 ms delay of regenerative braking torque ramp-out, and the raw, or undelayed regenerative braking torque ramp out that is reported to the vehicle brake controller to compensate for a booster torque buildup delay of 200 ms corresponding to a brake pedal input of 25%.

A graph with regenerative torque command plotted as a function of time is shown in FIG. 3. The graph illustrates a 100 ms delay in regenerative braking torque command during ramp-out, during a vehicle speed V that is less than a higher threshold speed ($V_{regen\ ramp-out}+1$) and greater than a lower threshold speed ($V_{regen\ ramp-out}-1$). The graph also shows the raw, or undelayed regenerative braking torque command that is broadcasted to the vehicle brake controller in order to synchronize regenerative braking ramp out with friction braking ramp in. Together with the powertrain response time, the total time between the estimated regenerative braking torque at wheel level and the raw, or undelayed regenerative braking torque command compensates the booster torque buildup delay of 200 ms, corresponding to a brake pedal travel distance of 25%.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A controller-implemented regenerative braking control method, comprising one or more controllers causing:
    applying a delay to a regenerative braking torque command from vehicle system controller to a hybrid powertrain, the delay following application of regenerative braking, the regenerative braking torque command comprising a delayed regenerative braking torque ramp-out signal initiating ramp-out (reduction) of regenerative braking force applied to the hybrid powertrain, the delay corresponding to a delay in applying a friction braking torque;
    during the delay sending without the delay the regenerative braking torque command comprising an undelayed regenerative braking torque ramp-out signal to a vehicle brake controller at onset of transition from regenerative braking to friction braking of a vehicle if a speed of the vehicle falls below a threshold value;
    calculating the friction braking torque by the vehicle brake controller using the undelayed regenerative braking torque command; and
    applying the calculated friction braking torque while reducing the applied regenerative braking force.

2. The method of claim 1 further comprising a step of comparing the vehicle speed to a threshold value, the threshold value corresponding to vehicle speed at initiation of regenerative braking torque ramp-out plus about 1 km/hr.

3. The method of claim 2 further comprising a step of selecting a vehicle speed at onset of transition from regenerative braking to friction braking of a vehicle prior to said comparing the vehicle speed step.

4. The method of claim 2 wherein the threshold value is about 9 km/hr.

5. The method of claim 1 further comprising sending an estimated regenerative braking torque at wheel level signal to the vehicle brake controller if the vehicle speed is higher than the threshold value.

6. The method of claim 1 wherein if the vehicle speed falls below the threshold value comprises if the vehicle speed falls between a pair of threshold values.

7. The method of claim 6 wherein the pair of threshold values comprises a lower threshold value corresponding to the vehicle speed at initiation of regeneration torque ramp-out minus about 1 km/hr and an upper threshold value corresponding the vehicle speed at initiation of regeneration torque ramp-out plus about 1 km/hr.

8. The method of claim 1 further comprising following the delay sending the delayed regenerative braking torque command to the hybrid powertrain if the vehicle speed falls between a pair of threshold values.

9. The method of claim 1 further comprising sending an estimated regenerative braking torque at wheel level signal to the vehicle brake controller if the vehicle speed is lower than the threshold value.

10. A controller-implemented regenerative braking control method, comprising one or more controllers causing:
   selecting a vehicle speed at onset of friction braking of a vehicle;
   comparing the vehicle speed to a threshold value;
   transmitting a regenerative braking torque command from a vehicle system controller, the regenerative braking torque command initiating ramp-out (reduction) of regenerative braking force following the regenerative braking force being applied to a hybrid powertrain;
   delaying sending of the regenerative braking torque command to the hybrid powertrain if the vehicle speed falls below the threshold value, the delay corresponding to a delay in applying a friction braking torque;
   applying regenerative braking torque to the hybrid powertrain; and
   during the delay sending without the delay the regenerative braking torque command comprising an undelayed regenerative braking torque ramp-out signal from the vehicle system controller to a vehicle brake controller at onset of friction braking of the vehicle if the vehicle speed falls below the threshold value;
   calculating the friction braking torque by the vehicle brake controller using the undelayed regenerative braking torque command; and
   applying the calculated friction braking torque while reducing the applied regenerative braking force.

11. The method of claim 10 wherein the threshold value corresponds to the vehicle speed at initiation of regenerative braking torque ramp-out plus about 1 km/hr.

12. The method of claim 11 wherein the threshold value is about 9 km/hr.

13. The method of claim 10 wherein if the vehicle speed falls below the threshold value comprises if the vehicle speed falls between a pair of threshold values.

14. The method of claim 13 wherein the pair of threshold values comprises a lower threshold value corresponding to the vehicle speed at initiation of regeneration torque ramp-out minus about 1 km/hr and an upper threshold value corresponding the vehicle speed at initiation of regeneration torque ramp-out plus about 1 km/hr.

15. A controller-implemented regenerative braking control method, comprising one or more controllers causing:
   selecting a vehicle speed at onset of friction braking of a vehicle;
   comparing the vehicle speed to a threshold value;
   transmitting a regenerative braking torque command from a vehicle system controller, the regenerative braking torque command initiating ramp-out (reduction) of regenerative braking force following the regenerative braking force being applied to the hybrid powertrain;
   delaying transmission of the regenerative braking torque command to a hybrid powertrain if the vehicle speed falls below the threshold value, the delay corresponding to a delay in applying a friction braking torque;
   during the delay sending without the delay the regenerative braking torque command comprising an undelayed regenerative braking torque ramp-out signal from the vehicle system controller to a vehicle brake controller at onset of friction braking of the vehicle if the vehicle speed falls below the threshold value;
   sending an estimated regenerative braking torque at wheel level signal comprising the undelayed regenerative braking torque ramp-out signal to the vehicle brake controller if the vehicle speed does not fall below the threshold value;
   calculating the friction braking torque by the vehicle brake controller using one of the undelayed regenerative braking torque command and the estimated regenerative braking torque; and
   applying the calculated friction braking torque while reducing the applied regenerative braking force.

16. The method of claim 15 wherein the threshold value corresponds to the vehicle speed at initiation of regenerative braking torque ramp-out plus about 1 km/hr.

17. The method of claim 16 wherein the threshold value is about 9 km/hr.

18. The method of claim 15 wherein if the vehicle speed falls below the threshold value comprises if the vehicle speed falls between a pair of threshold values.

19. The method of claim 18 wherein the pair of threshold values comprises a lower threshold value corresponding to the vehicle speed at initiation of regeneration torque ramp-out minus about 1 km/hr and an upper threshold value corresponding the vehicle speed at initiation of regeneration torque ramp-out plus about 1 km/hr.

* * * * *